United States Patent
Kuriyama et al.

[11] Patent Number: 6,034,685
[45] Date of Patent: Mar. 7, 2000

[54] DATA INPUTTING DEVICES

[75] Inventors: Yuji Kuriyama, Ome; Masaki Sugihara, Akishima; Koji Moriya, Higashiyamato; Katsuyoshi Kaneko, Hamura; Motoyuki Kashiwagi, Fussa, all of Japan

[73] Assignee: Casio Computer Co., Ltd., Tokyo, Japan

[21] Appl. No.: 09/085,726

[22] Filed: May 27, 1998

Related U.S. Application Data

[63] Continuation of application No. 08/604,176, Feb. 21, 1996.

[30] Foreign Application Priority Data

Feb. 24, 1995 [JP] Japan .................................. 7-37085
Feb. 27, 1995 [JP] Japan .................................. 7-38504

[51] Int. Cl.⁷ ..................................................... G09G 5/00
[52] U.S. Cl. ........................ 345/341; 345/169; 345/173; 345/179; 345/123; 382/181; 382/309
[58] Field of Search ............................. 345/173, 179, 345/169, 145, 156, 341; 382/186, 189, 309; 364/705.03, 705.06

[56] References Cited

U.S. PATENT DOCUMENTS

| | | | |
|---|---|---|---|
| 4,972,496 | 11/1990 | Sklarew | 382/187 |
| 5,063,600 | 11/1991 | Norwood | 382/186 |
| 5,455,901 | 10/1995 | Friend et al. | 345/179 |
| 5,491,495 | 2/1996 | Ward et al. | 345/173 |
| 5,491,758 | 2/1996 | Bellegarda et al. | 382/187 |
| 5,517,578 | 5/1996 | Altman et al. | 345/173 |
| 5,528,743 | 6/1996 | Tou et al. | 345/179 |
| 5,546,538 | 8/1996 | Cobbley et al. | 382/187 |
| 5,561,446 | 10/1996 | Montlick | 345/173 |
| 5,581,366 | 12/1996 | Merchant et al. | 358/400 |
| 5,583,543 | 12/1996 | Takahashi et al. | 382/189 |
| 5,590,107 | 12/1996 | Chatani | 369/54 |
| 5,590,257 | 12/1996 | Forcier | 395/792 |
| 5,594,640 | 1/1997 | Capps et al. | 395/794 |
| 5,596,350 | 1/1997 | Capps et al. | 345/173 |
| 5,614,926 | 3/1997 | Shigematsu et al. | 345/156 |
| 5,850,477 | 12/1998 | Takada | 382/186 |

*Primary Examiner*—Bipin Shalwala
*Assistant Examiner*—David L. Lewis
*Attorney, Agent, or Firm*—Frishauf, Holtz, Goodman, Langer & Chick, P.C.

[57] ABSTRACT

When data is keyed in by operating a keyboard K displayed in a touch panel input area 14a, its character code is stored in a real data memory 46b of a RAM 23 and data on its attribute, pointer and data length is stored as management data. When handwritten data is input by manipulating a handwriting board P displayed in the input area 14a, coordinate data corresponding to the locus of the input handwritten data is stored in the real data memory, and data on its attribute, pointer and data length is stored as management data. The keyed-in data including the character code and the handwritten data including image data are both displayed in an output area 14b on the basis of the real data and its management data. Data edition including data erasure can be dealt with in a unified manner.

7 Claims, 17 Drawing Sheets

FIG.20A

| COORDINATE STRINGS OF "A","C" |
| --- |
| PEN DETACH |
| COORDINATE STRINGS OF "B" |
| PEN DETACH |

FIG.20B

| COORDINATE STRINGS OF "D" |
| --- |
| PEN DETACH |

FIG.20C

| COORDINATE STRINGS OF "ef" |
| --- |
| PEN DETACH |

DATA INPUTTING DEVICES

This is a continuation of application Ser. No. 08/604,176 filed Feb. 21, 1996.

BACKGROUND OF THE INVENTION

1. Field of the Invention

The present invention relates to data inputting devices and more particularly to a device with a coordinate inputting unit such as a transparent tablet provided on a display and which inputs handwritten data therethrough.

2. Related Art of the Invention

Conventionally, in an information terminal device with a tablet-integral display screen, handwritten data is input by manipulating the tablet. In this case, characters are recognized from the handwritten data and converted to code data or otherwise the handwritten data as it is is input. In this information terminal device, a keyboard can be displayed on its display screen into which characters can be input by touching the keyboard.

However, when a character string input through the keyboard and a character string input by handwriting are dealt with in a mixed manner in the conventional information terminal devices, the keyed-in code character string and the handwritten character string, the characters on which are recognized and converted to code data, can equally be dealt with as code data. The handwritten character string as it is is dealt with as independent image data, so that the character string as it is and the keyed-in code character string cannot equally be dealt with, disadvantageously.

Since the handwritten character string as it is is processed as independent image data, it can not be corrected and deleted as word unit data.

SUMMARY OF THE INVENTION

It is therefore an object of the present invention to provide a data inputting device which is capable of processing handwritten data like keyed-in code data.

In order to achieve the above object, the present invention provides a data inputting device comprising:

inputting means for inputting code data and handwritten data;

a first memory for storing the code data input by the inputting means;

a second memory for storing the handwritten data input by the inputting means;

a third memory for storing in a predetermined order position data of the code data and handwritten data stored in the first and second memories, respectively;

a fourth memory for storing display data;

control means for reading code data and handwritten data from the first and second memories, respectively, on the basis of the position data stored in the third memory and for converting the read data to display data and for writing the converted data into the fourth memory; and display means for displaying the display data written by the control means into the fourth memory.

According to the present invention, there is also provides a data inputting device including a display screen and a coordinate inputting unit superposed on the display screen, comprising:

means for displaying on the display screen a handwriting board having a defined input area;

means for storing continuous coordinate data obtained by pen touching on the handwriting board;

means for delineating a handwritten line on the display screen on the basis of coordinate data stored in storage means;

means for determining whether coordinates in a predetermined area have been obtained in the course of the associated handwritten data being input; and means for scrolling the handwritten line displayed on the display screen by pen detaching when the determining means determines that coordinates in the predetermined range have been obtained.

BRIEF DESCRIPTION OF THE DRAWINGS

FIGS. 3A to 3D show an input display and an output display on a touch panel of the communication device, wherein FIG. 3A shows an output display of key data input by a key-in operation; FIG. 3B shows a display of a scroll starting line L involved in a handwriting process; FIG. 3C shows a scrolled state of handwritten data involved in the handwriting process; and FIG. 3D shows an output display of handwritten data input by the handwriting process;

FIGS. 14A and 14B show a coordinate sample state of handwritten data on the touch panel, wherein FIG. 14A shows the positions of the coordinate data sampled as the data is handwritten; and FIG. 14B shows the coordinate data sampled as the data is handwritten and input, and stored in the handwriting buffer;

FIGS. 20A to 20C show coordinate data written in a character string buffer of the RAM in the character string write subprocess of the character string extraction process.

DESCRIPTION OF THE PREFERRED EMBODIMENTS

Figure 1:
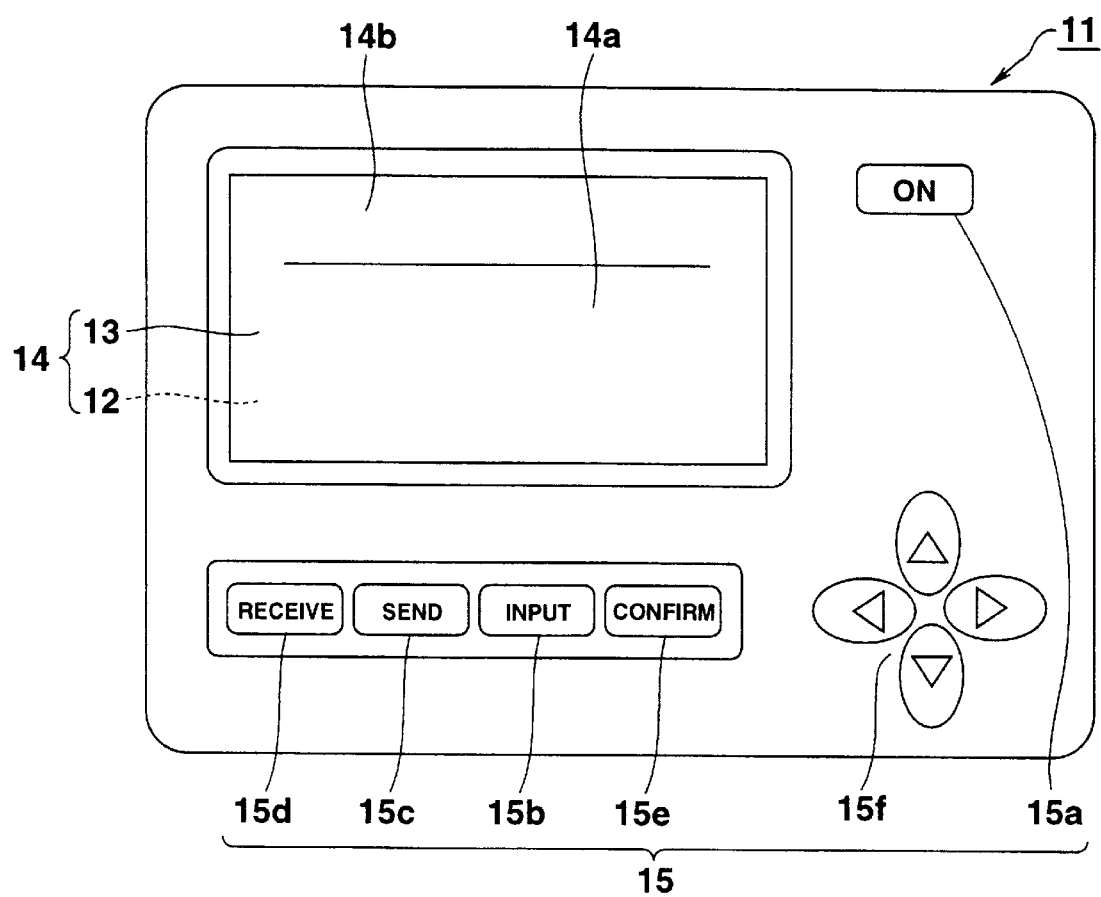
FIG. 1 is a front view of a portable information communication device which includes an inputting unit according to the present invention.

Structure:

FIG. 1 is a front view of a portable information communication device which includes an input device according to the present invention.

The communication device body 11 is of a size in which the user can hold the body in one hand. The body has on its front a touch panel 14 which includes a liquid crystal display panel 12 as a display and a tablet 13 as a coordinate input unit which are placed at a position displaced somewhat upward and leftward from the center of the front thereof.

The touch panel 14 includes an input area 14a where either a key-in operation can be performed on a displayed keyboard or a handwriting input operation can be performed at a displayed handwriting input board, and an output area 14b where the keyed-in data/handwritten data fixed in the input area 14a is displayed.

A key-in unit 15 is provided along a part of the periphery of the touch panel 14. The key-in unit 15 includes an "ON" key 15a operated for turning on a power supply (not shown), an "INPUT" key 15b operated to designate a data inputting mode, a "SEND" key 15c operated to send data, a "RECEIVE" key 15d operated when data is displayed, a "CONFIRM" key 15e operated when the received data was confirmed, and a "CURSOR" key unit 15f operated to move a cursor displayed on the touch panel 14 and to select data.

Figure 2:
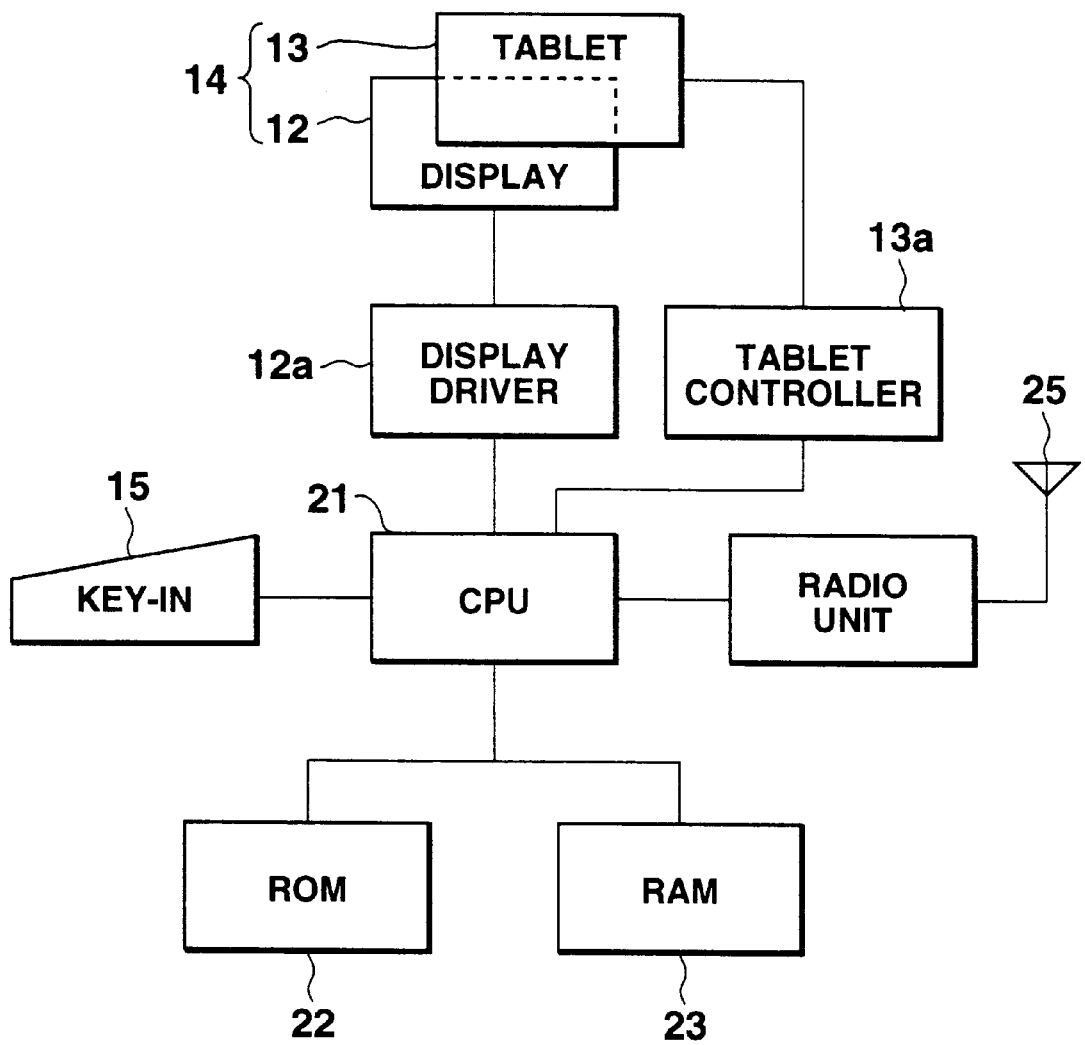
FIG. 2 is a block diagram indicative of the structure of an electronic circuit of the communication device.

FIG. 2 is a block diagram of an electronic circuit of the communication device. The electronic circuit includes a controller (CPU) 21, which starts up a system program beforehand contained in a ROM 22 in accordance with a touch input operation signal input from the tablet 13 through a tablet control 13a or a key-in operation signal input from the key-in unit 15 to thereby control the operations of the respective elements of the electronic circuit. CPU 21 is connected to the tablet control unit 13a, tablet 13, key-in unit 15, ROM 22, and RAM 23 as well as an antenna 25 through a radio unit 24.

CPU 21 is also connected to the liquid crystal display panel 12 through a display driver 12a. The tablet 13 of the touch panel 14 has a transparent flat area corresponding to the display area of the display panel 12 and superposed on the display screen of the panel 12. When a pen touches any point on the tablet 13, a voltage signal corresponding to the touched position and a touch input interrupt signal are delivered through the tablet control unit 13a to CPU 21.

Thus, CPU 21 detects the touch input coordinates on the panel 12 on the basis of the voltage signal through the tablet controller 13a from the tablet 13 and displays a touch input locus, and determines the content of the touch operation on the basis of the content of the display at that time.

ROM 22 contains a system program which controls the whole operation of the communication device, a key-in operation program which performs a key-in operation, using a displayed keyboard, a handwriting input operation program which performs a handwriting input operation, using a displayed handwriting board, a handwritten data conversion program which converts handwritten data to output data, an output operation program which performs an outputting operation for keyed-in data/handwritten data, a back space key operation program used for deletion of keyed-in data/handwritten data in a manner traced back from its end data and subprograms for various other operational modes. ROM 22 also contains as character generators font patterns of all the characters, numerals, signs to be displayed on the display panel 12. It also contains data on a predetermined scroll starting position where a scroll process for handwritten data input/displayed on the touch panel input area 14a is started, data on a scroll width and data on maximum scroll count in the startup of the handwritten input processing program. In the embodiment, the scroll width is two thirds of the length of the input area 14a and the maximum scroll count is three. The scroll starting position is four fifths of the length of the input area 14a (see FIG. 3B).

Figure 3:
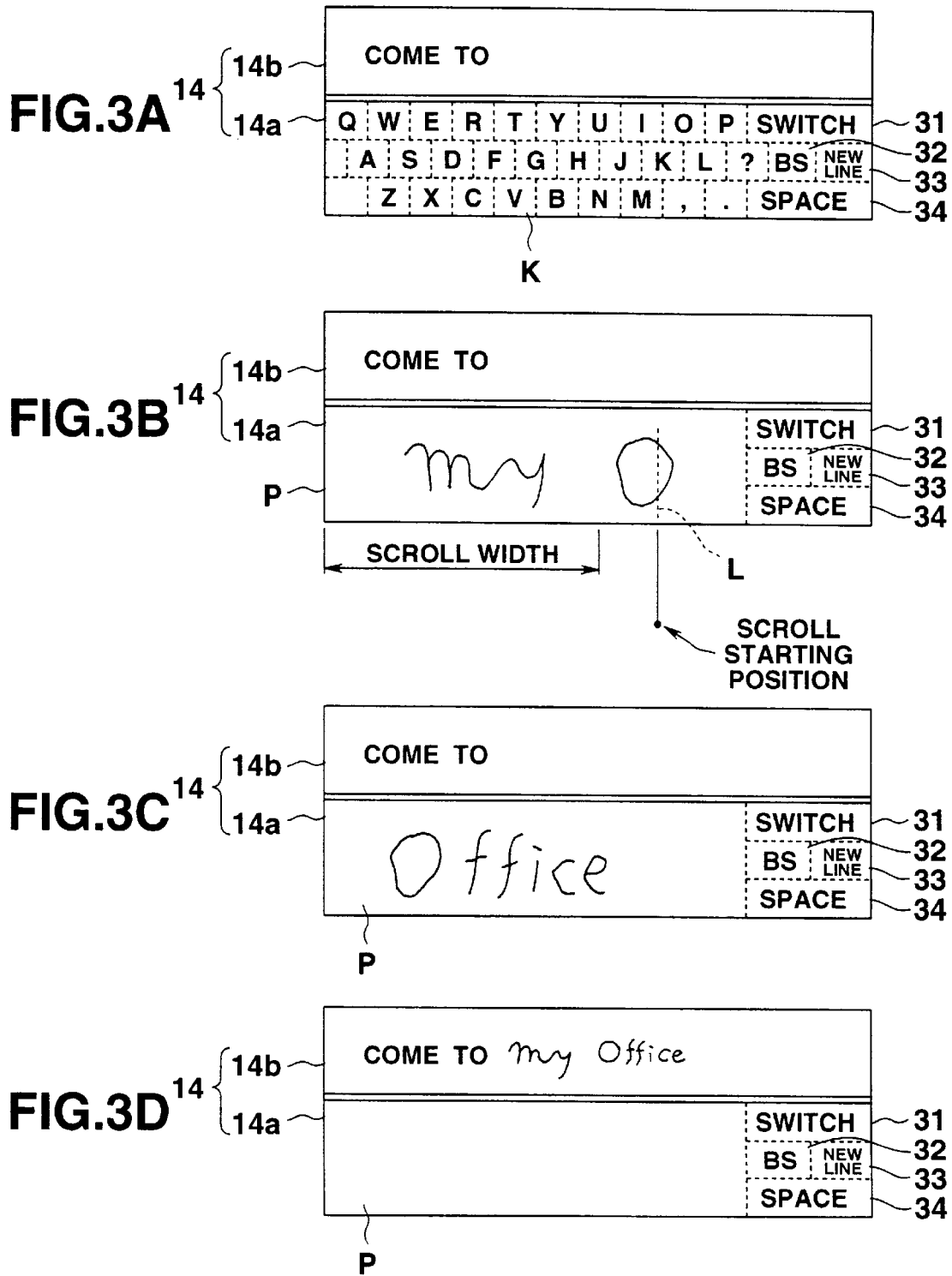

FIG. 3A shows a key-in state in which a keyboard K is displayed in the input area 14a of the touch panel 14. FIGS. 3B to 3D shows a handwriting state in which a handwriting board P is displayed in the input area 14a.

Always displayed on the right side of the input area 14a of the touch panel 14 are a "SWITCH" key 31 operated to perform switching between a key-in process performed at the displayed keyboard K and a handwriting process performed at the displayed handwriting board P, a "BS" (back space) key 32 operated when keyed-in data or handwritten data is deleted in a manner traced back from its end data, a "NEW LINE" key 33 operated when the data input position is changed to start a new line, and a "SPACE" key 34 operated when the input data is marked off in a word unit.

As shown in FIG. 3A, data keyed in by touching the keyboard K displayed in the touch panel input area 14a is sequentially displayed on the output area 14b.

As shown in FIG. 3B, the locus of handwritten data input by touching the handwriting-in board P displayed in the touch panel input area 14a is displayed by sampling the touched position coordinates (x, y) at constant periods and sequentially connecting the sampled coordinates $(x_1, y_1)$, $(x_2, y_2), \ldots, (x_n, y_n)$ one to the other by a line segment (echo back display).

The origin for coordinates $(x_n, y_n)$ is set at the upper left corner of the touch panel 14.

When the handwriting-in position exceeds the scroll starting line L, the echo-back displayed handwritten data is scrolled in a predetermined scroll width and a continuous handwritten input is achieved, as shown in FIG. 3C.

The handwritten data string is fixed in units of a word by the marking-off operation of the "SPACE" key 34 and displayed in the output area 14b, as shown in FIG. 3D.

Figure 4:
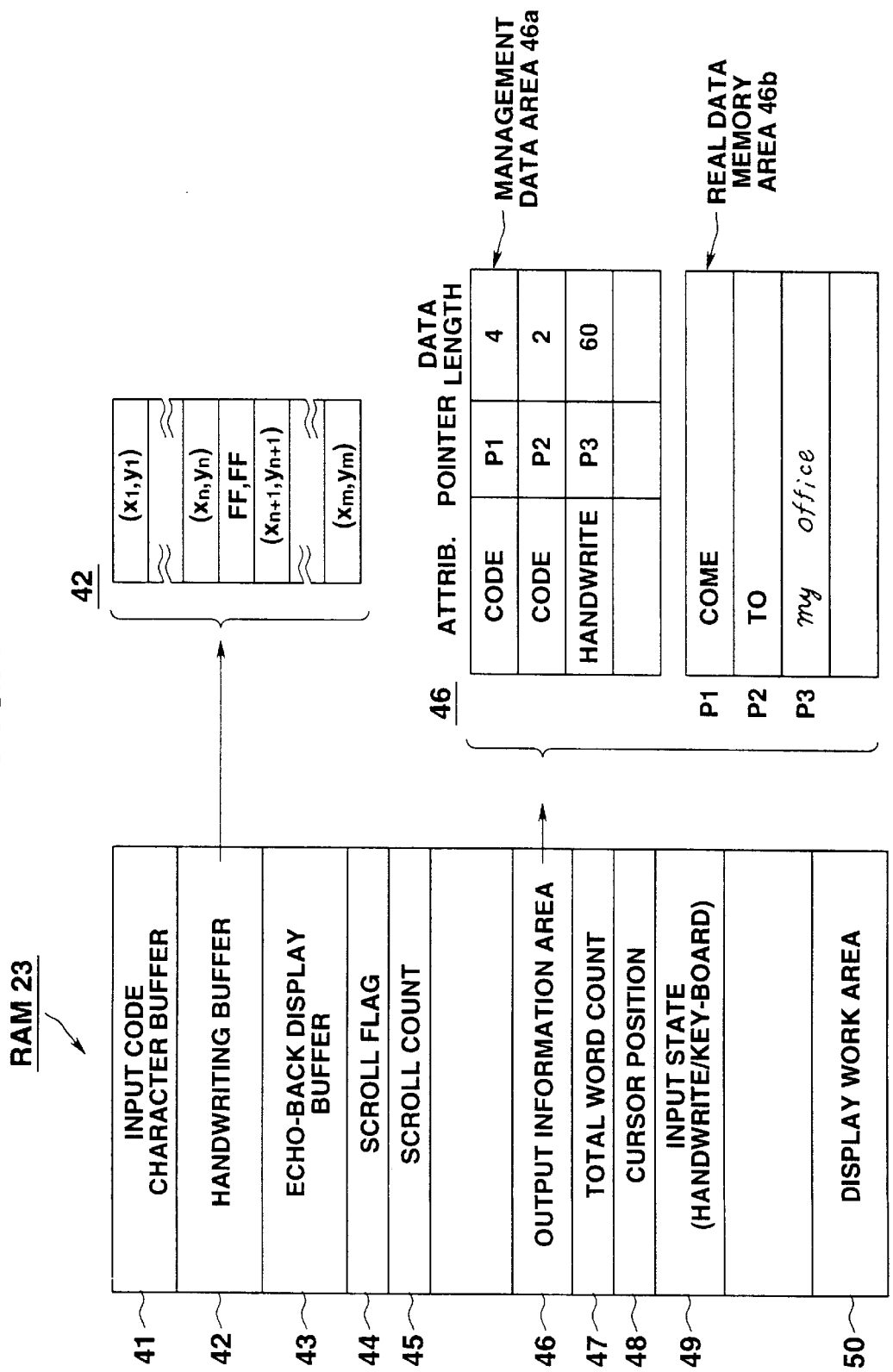
FIG. 4 shows the structure of a data area provided in a RAM of the communication device.

FIG. 4 shows the structure of a storage area of RAM 23, which includes an input code character buffer 41, a handwriting buffer 42, an echo-back display buffer 43, a scroll flag register 44, a scroll count register 45, an output information area 46, a word count register 47, a cursor position register 48, an input state register 49, and a display work area 50.

The input code character buffer 41 temporarily stores character codes corresponding to touched keys of the displayed keyboard K of the touch panel input area 14a.

As shown in FIG. 4, the handwriting buffer 42 temporarily stores data on coordinates $(x_1, y_1), (x_2, y_2), \ldots, (x_n, y_n)$ of a handwritten locus input and formed by touching the handwriting board P displayed in the touch panel input area 14a and a pen detach code (FF, FF) indicating a point in the locus where the pen is detached from the panel.

The echo-back display buffer 43 stores data on the image of a locus of coordinates stored in the handwritten data buffer 42 and connected by the corresponding segments. In this case, the position for a pen detach code is expressed by the absence of a line segment.

When a handwritten-in position on the handwriting board P exceeds the scroll line L, "1" is set in the scroll flag register 44. The scroll count of handwritten data in the handwritten-in board P is stored in the scroll count register 45.

The output information area 46 consists of a management data area 46a and a real data memory area 46b. Keyed-in data and handwritten data stored in the input code character buffer 41 and handwriting buffer 42 are moved in units of a word corresponding to the marking-off operation of the "SPACE" key 34 to the real data memory 46b and stored in same. The respective attribute data, pointer data indicative of the storage positions for the corresponding attribute data, and data length are stored in the management data area 46a in corresponding relationship.

The total word count register 47 stores the total word count for accumulated keyed-in data and handwritten data input as a word unit by the marking-off operation of the "SPACE" key 34.

The cursor position register 48 stores data indicative of the cursor position which is sequentially updated.

The input state register 49 stores data indicative of the operated state of keys of the displayed keyboard K or the handwritten state of the handwriting board P.

The display work area 50 has a display dot pattern storage area corresponding to the touch panel output area 14b. It stores, as display data which is disposed sequentially in units of a word, the keyed-in data and handwritten data stored in the output information area 46.

INPUTTING PROCESS

The data inputting process of the portable communication device including the inputting device of the present invention will be described next.

Figure 5:
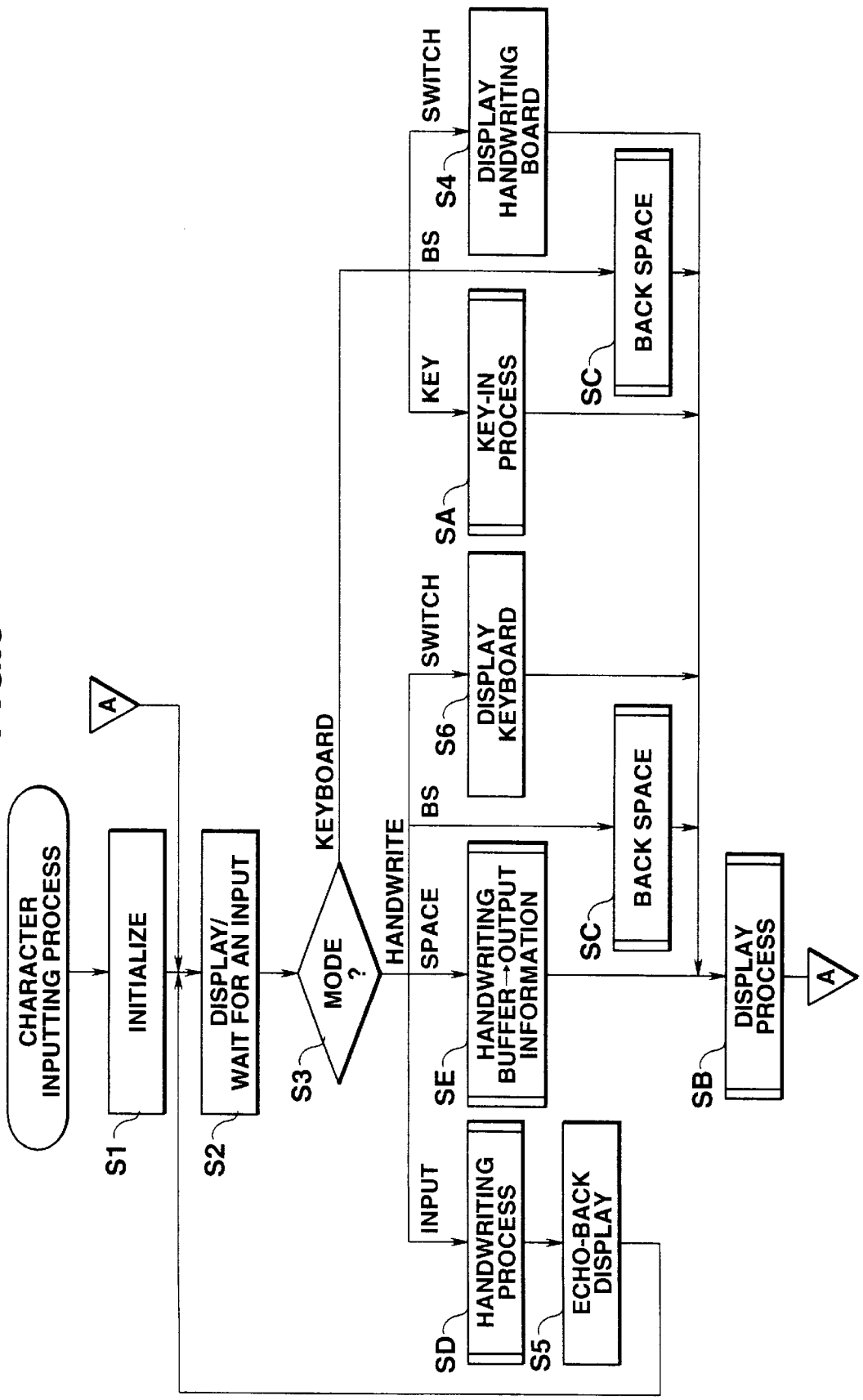
FIG. 5 is a flow chart indicative of a character inputting process performed in the communication device.

When the "INPUT" key 15b of the key-in unit 15 is operated, the character inputting process of FIG. 5 is started. First, the registers of RAM 23 are cleared and initialized and the communication device is placed in a standby state where it waits for an input to the touch panel 14 (steps S1, S2).

In the present embodiment, key-in state data should be initially set in the input state register 49 of RAM 23. In this case, the keyboard K is displayed in a wait state in the touch panel input area 14a, as shown in FIG. 3A. When any key of the keyboard is touched, the control passes to the key-in process of FIG. 6 (step S3-SA).

When, for example, "COME" is input, character codes corresponding to the respective character keys "C", "O", "M", "E" are sequentially stored in the input code character buffer 41 of RAM 23 as the respective keys are operated (step A1→A2).

In response, the respective keyed-in character code data are sequentially transferred to the real data memory area 46b of the output information area 46 and stored there and their attribute data "CODE", pointer data "P1", and data length "4" are stored in the management data area 46a, as shown in FIG. 4 (steps A3, A4).

The attribute data indicates whether the input data is handwritten data or keyed-in code data. If the input data is keyed-in data, "CODE" is stored. The pointer indicates the head address of the real data memory area 46b in which the "COME" is stored.

The data length stored in the management data area 46a shows the stored length of the data. A character code requires 8 bits per character. When the data length is managed in units of a byte, the data length in the management data area 46a is updated in order of "1"→"2"→"3"→"4" as "COME" is input in order of "C"→"O"→"M"→"E".

Figure 7:
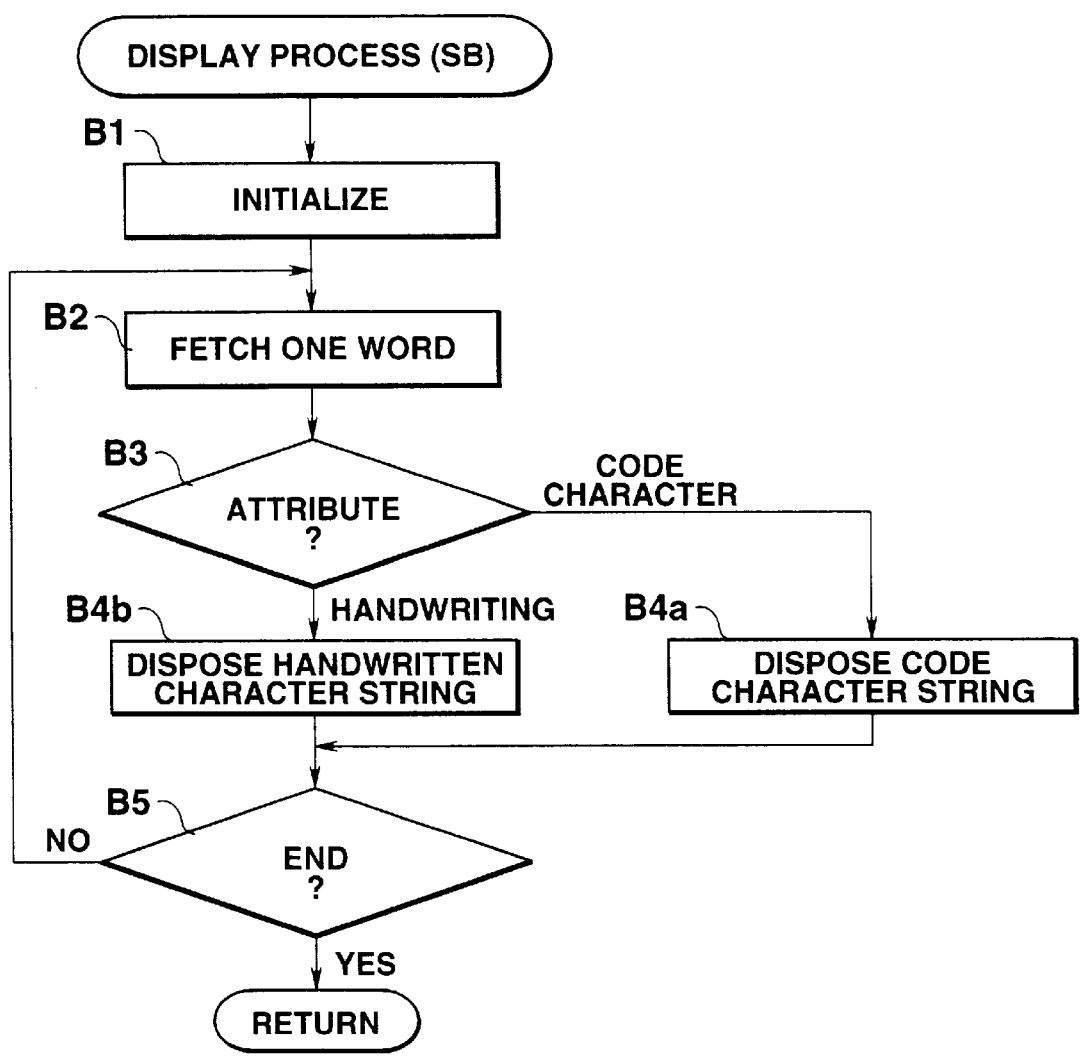
FIG. 7 is a flow chart indicative of a display process of the character inputting process.

Each time a key is operated, the control passes to a display process of FIG. 7 (step SA→SB). In this display process, first, the display work area 50 of RAM 23 is cleared and initialized (step B1). The keyed-in data "COME" stored in the real data memory area 46b of the output information area 46 is read in accordance with pointer data "P1" managed in the management data area 46a and its attribute data is determined as "CODE" (steps B2, B3).

In response, the keyed-in data "COME" read from the real data memory area 46b is sequentially converted as code characters to corresponding font patterns, which are then written into the display work area 50 and displayed in the touch panel output area 14b (step B3→B4a, B5→S2).

Figure 6:
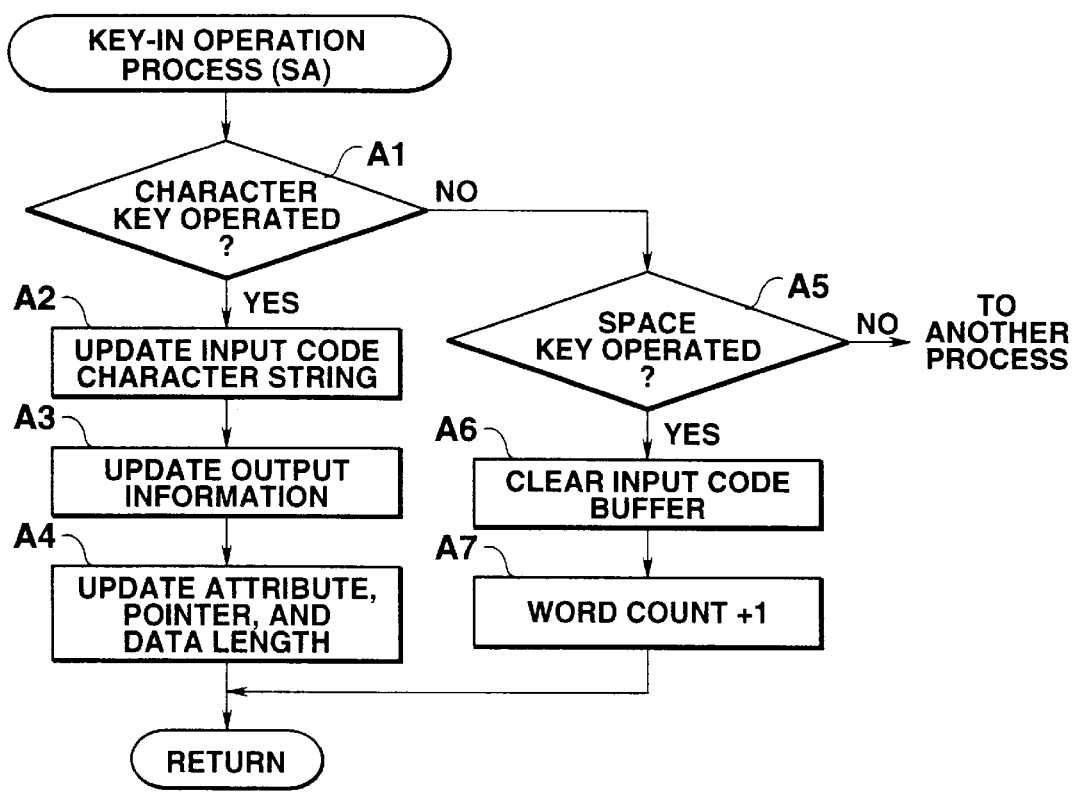
FIG. 6 is a flow chart indicative of a key-in process of the character inputting process.

In this way, when the "SPACE" key 34 is operated in a state in which the keyed-in data "COME" is displayed, the control passes to the key-in operation process of FIG. 6 (step S3→SA). The character code "COME" stored in the input code buffer 41 is cleared and the word count of the total word count register 47 is incremented by one to become "1" (step A1→A5→A6, A7).

Thus, the "COME" is fixed as one word. Thereafter, when "TO" is keyed in at the keyboard K displayed in the input area 14a and displayed in the output area 14b, and marked off as a word unit by the "SPACE" key 34, the key-in operation process of FIG. 6 and the display process of FIG. 7 are performed in a manner similar to that mentioned above, character codes corresponding to the keyed-in data "TO", and its attribute data "CODE", pointer data "P2", and data length "2" are stored in the output information area 46, and the word count in the total word count register 47 is updated to "2".

BACK SPACE KEY OPERATION PROCESS (1)

Figure 8:
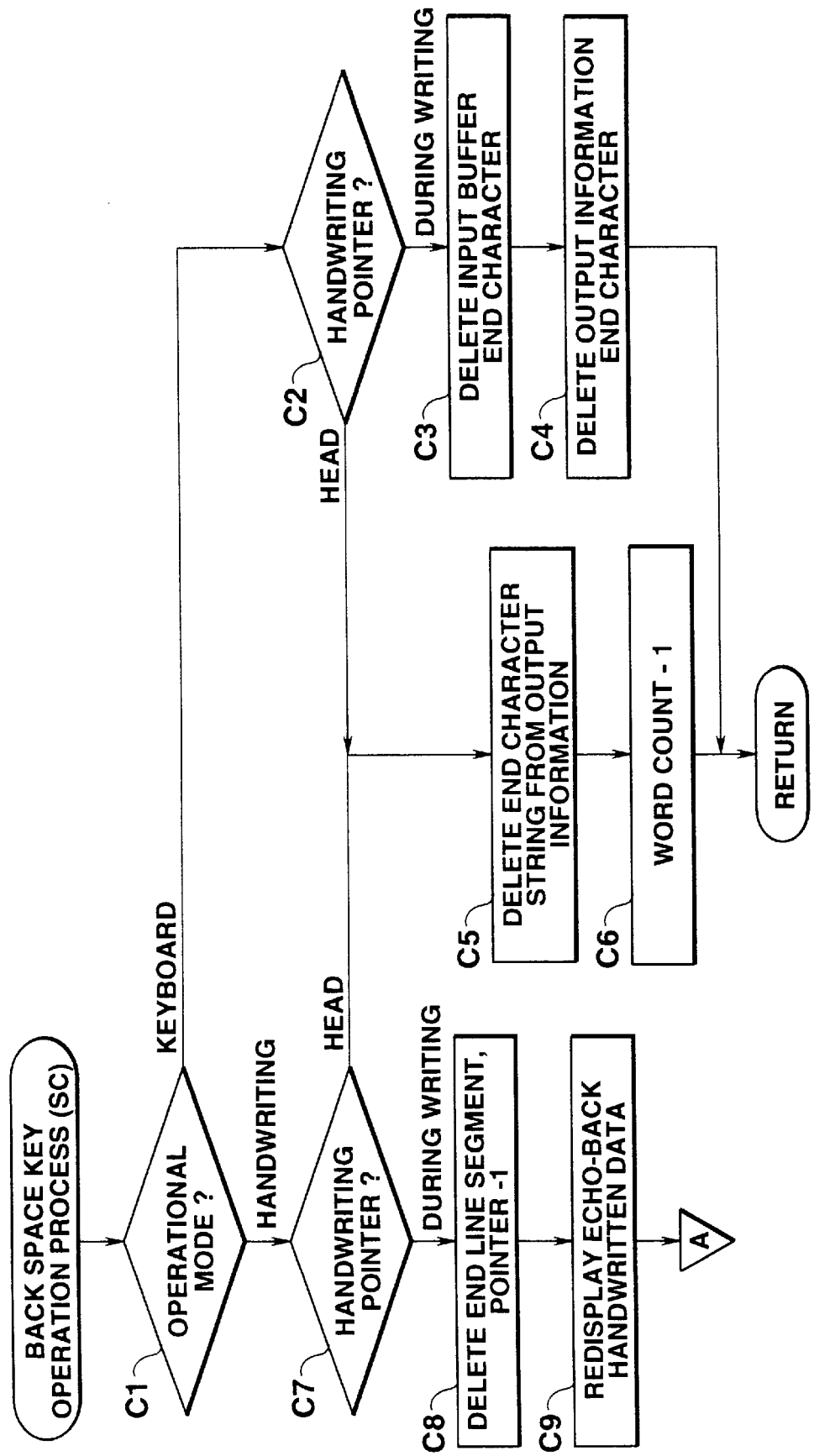
FIG. 8 is a flow chart indicative of a back space operation process of the character inputting process.

When the "BS" key 32 is operated to delete data keyed-in from the keyboard K, the control passes to the back space operation process of FIG. 8 (step S2→S3→SC).

In this back space operation process, first, the operational mode is determined on the basis of the input state data stored in the input state register 49 (step C1). When it is determined that the operational mode is the key-in data display mode in which the keyboard K is used to key in data, it is determined whether data is in the course of writing, depending on whether the write pointer indicative of the written position in the input code character buffer 41 is at the head of write positions in the buffer 41 (step C2).

Then, when up to the "COME"→(space)→"TO" are input and the "BS" key 32 is operated, it is determined that data is in the course of writing in the input code character buffer 41 because the data has not been marked off in units of a word by the "SPACE" key 34, and only code data on the end character "O" stored in the input code character buffer 41 is deleted (step C2→C3). Simultaneously, only "O" of the keyed-in data "TO" stored in the pointer P2 of the real data memory area 46b of the output information area 46 is deleted correspondingly, and the data length "2" stored in the management data area 46a is rewritten correspondingly to "1" (step C4).

In response, by the display process (steps B1, B2, B3→B4a, B5) of FIG. 7, keyed-in data "COME T" is disposed in the display work area 50 and the "COME T" obtained by deletion of only the end key-in data "O" is displayed in the output area 14b (step SB→S2).

When the "BS" key 32 is operated after up to the "COME"→(space)→"TO"→(space) is keyed in, it is determined that the input code character buffer 41 has been cleared and the write pointer has been returned to the head of the writing positions because the data "COME"→(space)→"TO"→(space) has been marked off in units of a word. Thus, the stored data "TO" pointed by the pointer "P2" of the real data memory area 46b of the output information area 46 is deleted in a word (character string) unit, and each of the attribute data "CODE", pointer "P2", data length "2" stored correspondingly in the management data area 46a is deleted (step C2→C5).

Simultaneously, the word count in the total word count register 47 is decremented by one to become "1" (step C6).

In response, the keyed-in data "COME" is disposed in the display work area 50 after the display process of FIG. 7 (steps B1, B2, B3→B4a, B5), and the "COME" obtained by deletion of the end input character string "TO" is displayed in the output area 14b (step SB→S2).

HANDWRITING-IN PROCESS

When the "SWITCH" key 31 is operated to input handwritten character data in a state in which "COME"→(space)→"TO"→(space) is input by touching on the keyboard K and displayed in the output area 14b, the handwriting board P is displayed in an input wait state, as shown in FIG. 3B in the touch panel input area 14a (step S3→S4→SB→S2).

Figure 9:
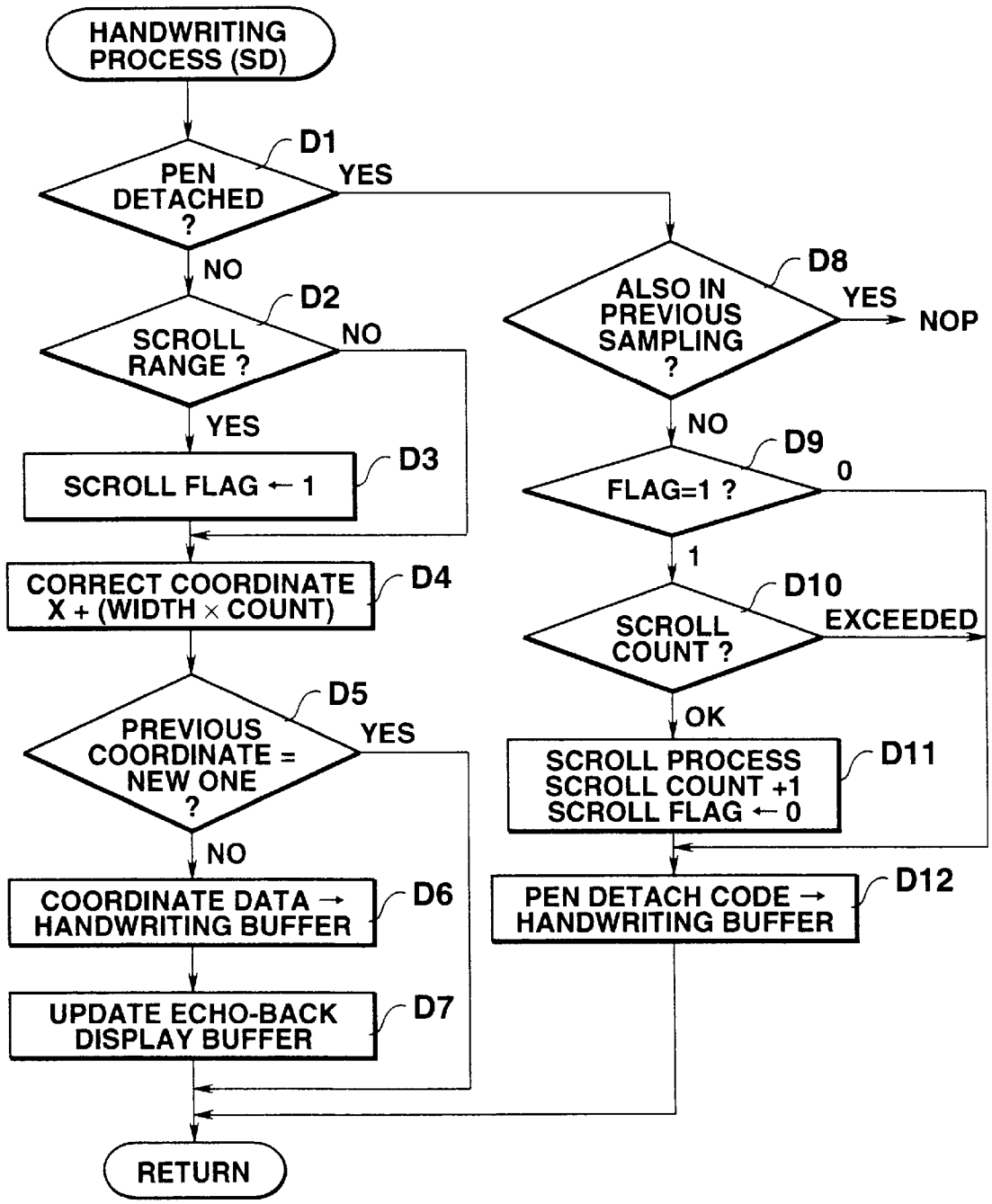
FIG. 9 is a flow chart indicative of a handwriting process of the character inputting process.

When "My" is then input by handwriting into the input area 14a, the control passes to a handwriting-in process of FIG. 9 (step S3→SD).

In the handwriting process, first, coordinate data (x, y) is sampled and it is then determined whether the pen is detached from the keyboard (step D1). If coordinate data has been input, it is determined whether the input position has passed the scroll starting line L. If so, "1" is set in the scroll flag register 44 (step D2→D3).

Only the x coordinate of the coordinate data (x, y) sampled as the handwritten data is input is corrected on the basis of the scroll width data stored beforehand in ROM 22 and the scroll count data stored in the scroll count register 45 of RAM 23 (step D4).

Since input positions does not exceed the scroll starting line L in the course of inputting of the handwritten data "My", no scroll flag has been set and the scroll count register 45 has been set at "0". Thus, coordinate data $(x_1, y_1)$, $(x_2, y_2) \ldots, (x_n, y_n)$ of the input locus sampled sequentially is not substantially corrected. The coordinates input this time and the last are compared. Only when the coordinate input this time is determined to be different from the last one, the new coordinate data input this time is stored into the handwriting buffer 42 of RAM 23 (step D2→D4, D5→D6).

In response, data on line segments which connects the respective coordinates $(x_1, y_1)$, $(x_2, y_2)$, . . . , $(x_n, y_n)$ sequentially stored in the handwriting buffer 42 one to the next are sequentially written into the echo-back display buffer 43 and the locus of the handwritten "My" is delineated and displayed on the handwriting board P (step D7→S5).

When the pen is detached from the handwriting board P after the "My" is handwritten, no input coordinate data is any longer obtained by sampling. Therefore, it is determined that the pen has been detached from the board P (step D1). In response, it is then determined whether pen detachment occurred in the last sampling operation. If not, it is then determined whether the scroll flag "1" has been set in the scroll flag register 44 of RAM 23 (step D1→D8→D9).

In this case, since no scroll flag has been set when the "My" was handwritten, pen detach code (FF, FF) data is stored in the handwriting buffer 42 subsequently to the storage of data on the respective coordinates $(x_1, y_1)$, $(x_2, y_2), \ldots (x_n, y_n)$ of the handwritten data "My" (step D9→D12).

In addition, when it is determined that the input position of "O" of the "Office" has exceeded the scroll starting line L as the "Office" is input by handwriting, "1" is set in the scroll flag register 44 (step D1→D2→D3).

The scroll flag has been set in the course of the handwritten data "O" having been input, but "O" has still been set in the scroll count register 45. Thus, the coordinate data $(x_{n+1}, y_{n+1})$, $(x_{n+2}, y_{n+2}), \ldots, (x_m, y_m)$ of the input locus sampled sequentially is not substantially corrected and only the new coordinate data is stored in the handwriting buffer 42 of RAM 23 and this continues likewise (step D2→D3, D4, D5→D6).

Image data on line segments which connect the respective coordinates $(x_{n+1}, y_{n+1})$, $(x_{n+2}, y_{n+2}), \ldots, (x_m, y_m)$ sequentially stored in the handwriting buffer 42 is sequentially written into the echo-back display buffer 43, and the locus of the handwritten "O" is delineated and displayed on the handwriting board P (step D7→S5).

When the pen is detached after "O" of the "Office" is handwritten, it is determined that the scroll flag "1" has been set in the scroll flag register 44. Thus, the scroll count stored in the scroll count register 45 is read out, and it is then determined whether the maximum possible scroll count stored beforehand in ROM 22 has been exceeded (step D1→D8→D9→D10).

In this case, since the scroll count stored in the scroll count register 45 is "0", it is determined that the maximum possible scroll count (3) has not been exceeded, and the displayed range of the handwritten image data written into the echo-back display buffer 43 for the handwriting board P is scrolled in accordance with the predetermined scroll width, data on which is contained beforehand in ROM 22. Simultaneously, the scroll count in the scroll count register 45 is incremented by one to become "1" and the scroll flag register 44 is reset at "0" (step D10→D11).

Subsequent to the respective coordinate data $(x_{n+1}, y_{n+1})$, $(x_{n+2}, y_{n+2}) \ldots, (x_m, y_m)$ of the handwritten data "O", the pen detach code (FF, FF) is stored in the handwriting buffer 42 (step D12).

As shown in FIG. 3C, when "ffice" is input by handwriting subsequently to "O", the respective coordinate data and a pen detach code are stored in the handwriting buffer 12. Image data on line segments which connect coordinates one to the next is written sequentially into the echo-back display buffer 43, and "ffice" is displayed subsequently to the display of the handwritten data "O" on the handwriting board P.

In this case, the respective x coordinates of the coordinates, data on which is stored sequentially into the handwriting buffer 42 in correspondence to the scrolled handwritten data "ffice" are corrected on the basis of the scroll count "1" stored in the scroll count register 45 and the predetermined scroll width, data on which is stored beforehand in ROM 22.

Figure 10:
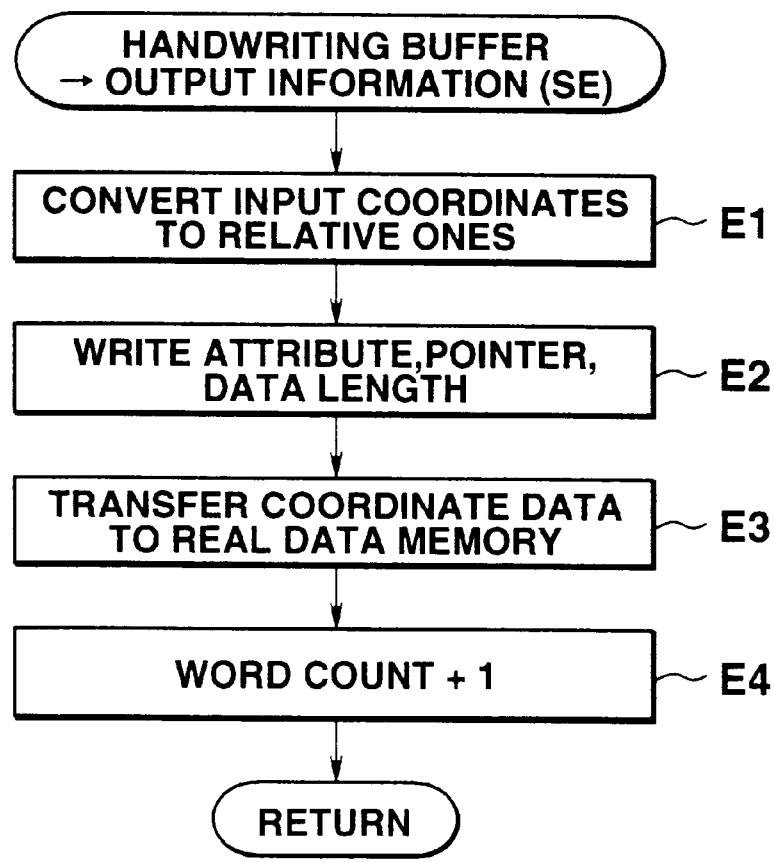
FIG. 10 is a flow chart indicative of a handwriting/output conversion process of the character inputting process.
Figure 11:
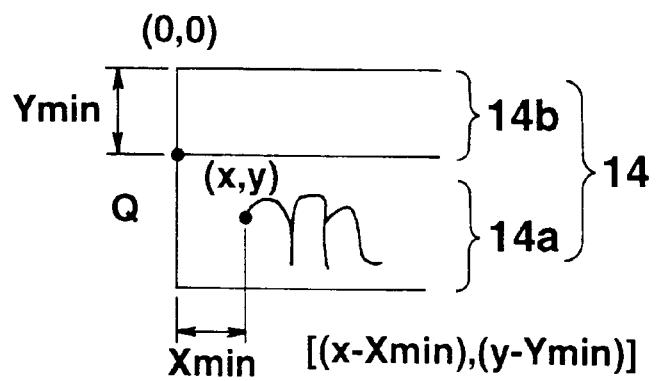
FIG. 11 illustrates a coordinate conversion process corresponding to a handwritten data output area for the handwriting/output conversion process.

In this way, when "My Office" displayed as shown in FIGS. 3B and 3C is marked off as a word unit by the "SPACE" key 34, the control passes to the handwriting/output conversion process of FIG. 10 (step S3→SE).

In this handwriting/output conversion process, first, the respective coordinates $(x_1, y_1), (x_2, y_2), \ldots$ corresponding to the handwriting "My Office" stored in the handwritten data buffer 42 are converted to relative coordinates corresponding to the output area 14b (step E1).

That is, the respective coordinates $(x_1, y_1), (x_2, y_2), \ldots$ corresponding to the handwritten data are relative to the origin which is the upper left end of the tablet 13 and converted to coordinates relative to the starting point Q (0, 0) which is the left end of the output area 14b in accordance with expression (1) below, so that the respective coordinate data of the handwritten data after the coordinate conversion is stored again in the handwriting buffer 12:

$$[(x-X_{min}), (y-Y_{min})] \quad \text{Expression (1)}$$

Along with this data, the attribute "handwriting", pointer "P3", and data length "60" of the handwritten data "My Office" marked off as a word unit are written into the management data area 46a of the output information area 46, as shown in FIG. 4 (step E2).

In this case, the data length "60" of the handwritten data "My Office" shows that the coordinate data string stored in the handwriting buffer 42 is written in 60 bytes.

The coordinate data string of the handwritten data stored in the handwriting buffer 42 is transferred to the real data memory area 46b of the output information area 46 as shown in FIG. 4, and the handwriting buffer 42 and the echo-back display buffer 43 are then cleared (step E3).

In response, the word count stored in the total word count register 47 is incremented by one to become "3" (step E4).

Control then passes to the display process of FIG. 7 (step SE→SB). In this display process, the display work area 50 of RAM 23 is initialized, and the handwritten data "My Office" stored in the real data memory area 46b of the output information area 46 is read out in accordance with the pointer data "P3" managed in the management data area 46a and its attribute data is determined to be "handwritten" (steps B1, B2, B3).

In response, the respective coordinate data which constitute the handwritten data "My Office" read out from the real data memory 46b are corrected to coordinate values which correspond to the ratio of the input height "a" of the input area 14a and the output height "b" of the output area 14b in accordance with Expression (2) below, and disposed and written into the display work area 50, and as shown in FIG. 3D, displayed subsequently to the keyed-in data "COME TO" in the output area 14b (step B3→B4b, B5→S2):

$$(x, y)-[\{x \cdot (b/a)\}, \{y \cdot (b/a)\}] \quad \text{Expression (2)}$$

BACK SPACE KEY OPERATION PROCESS (2)

When echo-back displayed handwritten data is desired to be deleted in the course of the handwritten data being input, the "BS" key 32 is operated. In response, the control passes to the back space key operation process of FIG. 8 (steps S2, S3, SC).

In the back space process, first, when it is determined that data is in the handwritten data input and display state, using the handwriting board P, it is then determined whether the write pointer indicative of the write position of the handwriting buffer 42 is at the head of the write positions or otherwise whether the data is in the course of handwriting (step C1→C7).

As shown in FIGS. 3B and 3C, when the "BS" key 32 is operated in the course of the "My Office" being handwritten, it is then determined that the writing pointer of the handwriting buffer 42 is in the course of writing because the "My Office" has not been marked off as a word by the "SPACE" 34, and the coordinate data sampled for the immediately preceding handwriting position is deleted from the handwriting buffer 42. The handwriting pointer of the handwritten data buffer 42 is decremented by one (step C7→C8).

In response, data on the image of the echo-back displayed handwritten data is displayed again with the image of the end line segment data being deleted on the basis of the coordinate data deleted in the handwriting buffer 42 (step C9→S2).

As shown in FIG. 3D, after the data "My Office" has been input by handwriting, and marked off as a word unit by the "SPACE" 34, and "BS" key 32 is then touched, the end handwritten data "My Office" stored in the pointer 3 of the real data memory 46b of the output information area 46 is deleted in a word (character string) unit because the handwritten data has been displayed in the output area 14b and the handwriting buffer 42 has been cleared and the pointer has been returned to the head of the writing positions. The associated attribute data "handwritten", pointer data "P3", data length "60" stored in the management data area 46a are also deleted respectively (step C7→C5).

Simultaneously, the word count of the total word count register 47 is decremented by one to become "2" (step C6).

In response to this operation, only the keyed-in data "COME TO" is disposed in the display work area 50 after the display process of FIG. 7, and "COME TO" obtained by the deletion of the end input character string "My Office" is displayed in the output area 14b (step SB→S2).

As shown in FIG. 3D, when the "SWITCH" key 31 is operated to input character data again in the key-in operation in a state in which the handwritten data "My Office" has been displayed in the output area 14b, the control returns to the key depression wait state where the keyboard K is again displayed in the touch panel input area 14a (step S3→S6).

While in the above the key-in operation of the key characters, using the keyboard K, has been illustrated, a fixed phrase menu display may be employed instead of the keyboard K.

For example, after a constant phrase "wait" is called and handwritten characters "10 a.m." or "Shibuya" (town name) are additionally input, a simple message is created and can be sent to the other party. If the display screen is large, both the keyboard K and the handwriting board P may be displayed simultaneously.

WORD DIVISION PROCESS FOR HANDWRITTEN DATA

In the above example, the handwritten data "My Office" has been dealt with as one word by operating the space key. An arrangement which is capable of automatically dealing with handwritten characters as a word unit without operating any special key such as the space key will be described next.

As an example, the case in which "ABCDEF" is handwritten irregularly and "ABC", "D"and "ef" are each recognized as a word will be described.

Figure 12:
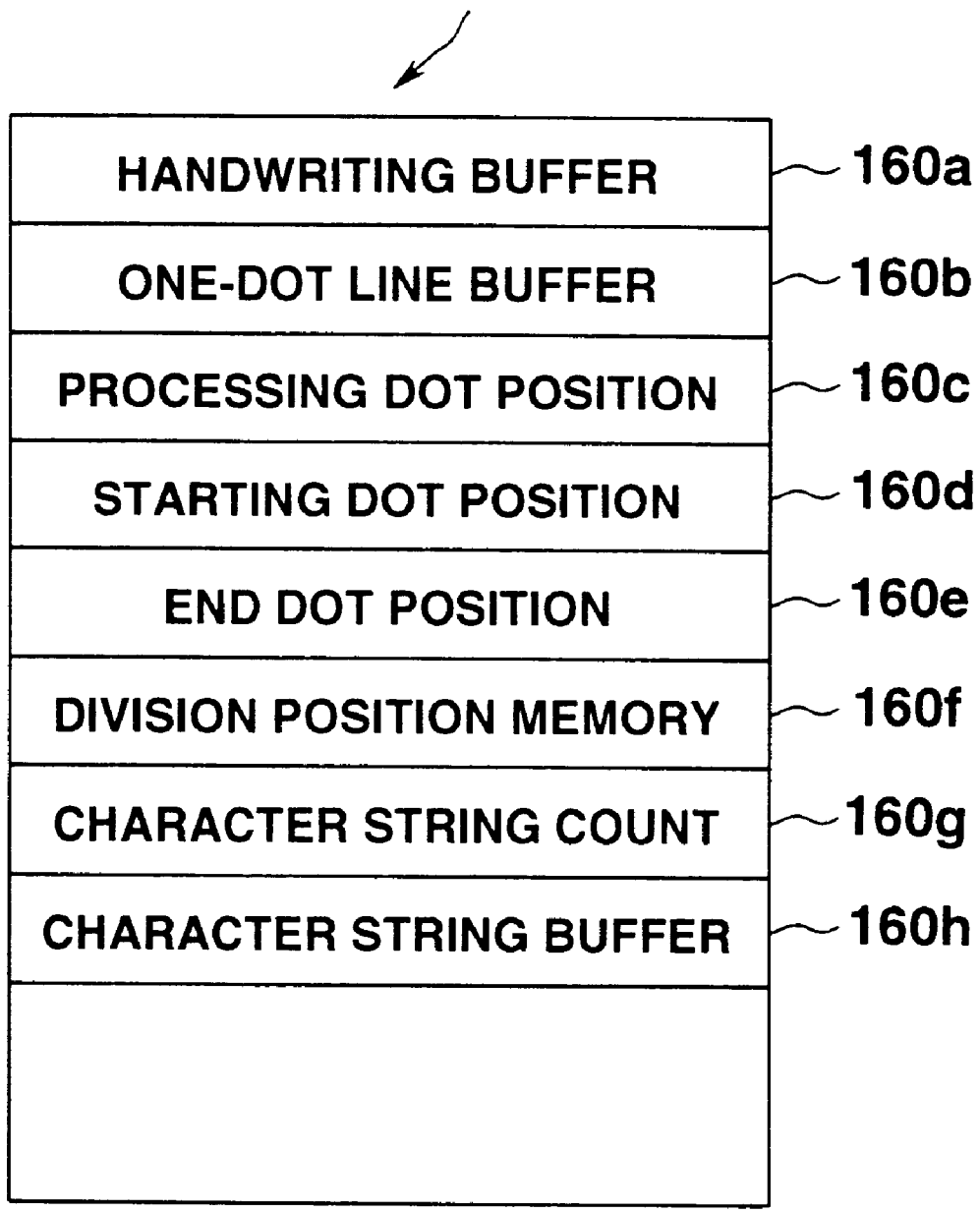
FIG. 12 shows the register structure of a RAM of the information device.

As shown in FIG. 12, for the purpose of this processing, RAM 23 further includes a handwriting buffer 160a, one-dot line buffer 160*b*, processing dot position buffer 160*c*, starting dot position buffer 160*d*, end dot position buffer 160*e*, division position memory 160*f*, character string count register 160*g* and character string buffer 160*h*.

Figure 13:
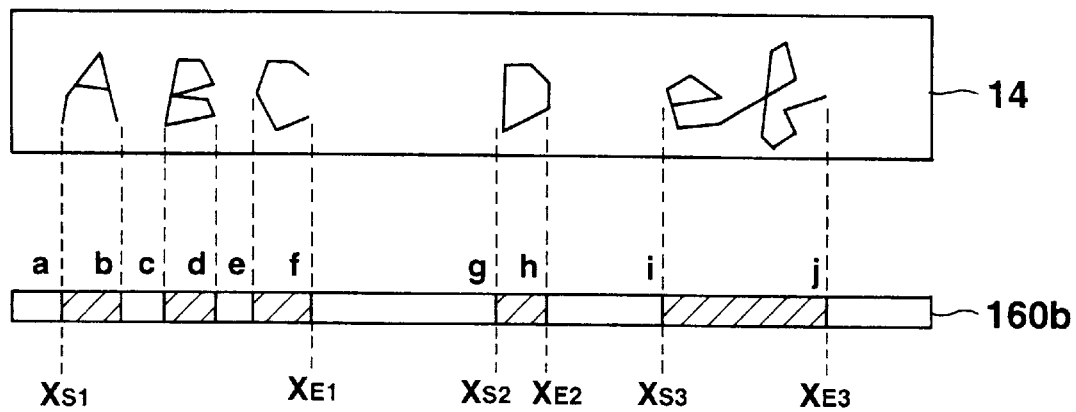
FIG. 13 shows a handwritten state of character string data on the touch panel of the information device and a state of dot data written into a one-dot line buffer of the RAM and corresponding to X coordinates of the character string data.

FIG. 13 shows a handwritten state of character string data in the touch panel 14 of the information device and a data disposition state of the one-dot line buffer 160*b* of RAM 23 corresponding to the X coordinates of the character string data.

Figure 14A:
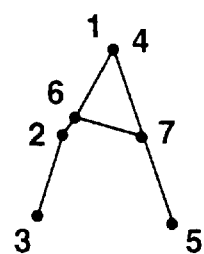
Figure 14B:
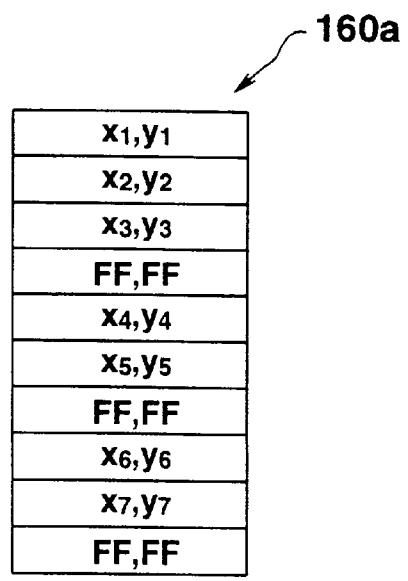

FIG. 14A shows the coordinate positions of the locus of handwritten data sampled as same is handwritten. FIG. 14B shows a state in which data on the coordinates is stored in the handwriting buffer 160*a*.

The locus of character data handwritten on the touch panel 14 is sampled as coordinates $(x_1, y_1), (x_2, y_2), \ldots$ at given periods and the respective sampled coordinates are connected one to the other by a line segment and displayed. Thus, the handwritten character data is displayed (echo-back display). Data on the respective sampled coordinates $(x_1, y_1), (x_2, y_2), \ldots$ is stored in the handwriting buffer 160*a* in order of its sequence of handwriting. When the pen is detached from the touch panel 14, a pen detach code "FF, FF" is written into the handwriting data buffer 160*a*.

Data on dots which fill the space between each and the next of x coordinates of the coordinate $(x_1, y_1), (x_2, y_2), \ldots$, data on which is stored in the handwritten data buffer 160*a*, is arranged in one line in the one-dot line buffer 160*b* in correspondence to those respective x coordinates.

The inputting operation of the touch panel information device with the data inputting device mentioned above will be described next.

Figure 15:
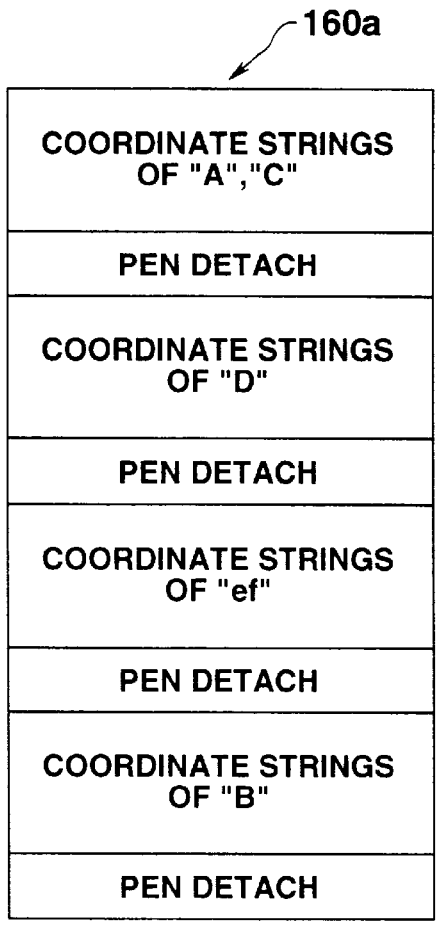
FIG. 15 shows a storage state of coordinate data corresponding to a character string input in the handwriting buffer of the RAM.

As shown in FIG. 13, when "A", "C", "D", "ef" are written in this order by the touch pen onto the touch panel 14 and then "B" is written in the space between the "A" and "C", coordinate data obtained by sampling the respective written locus of the characters is sequentially stored as a coordinate string written in this order in the handwritten data buffer 160*a* of RAM 23, as shown in FIG. 15.

Figure 16:
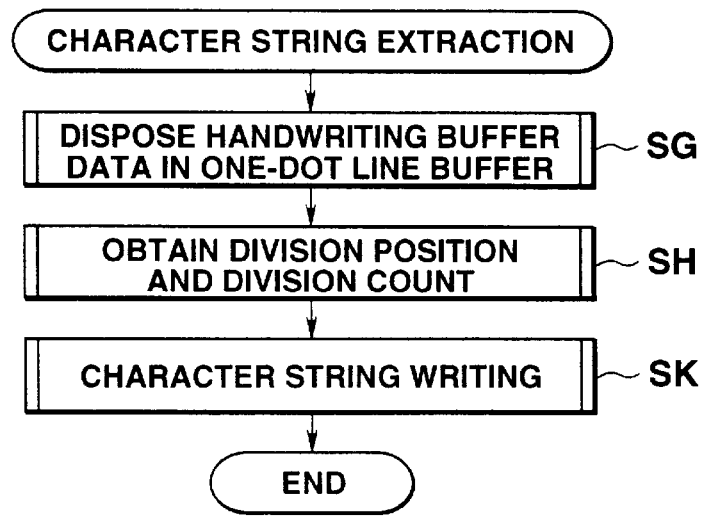
FIG. 16 is a flow chart indicative of a character string extraction process performed when the character is input.
Figure 17:
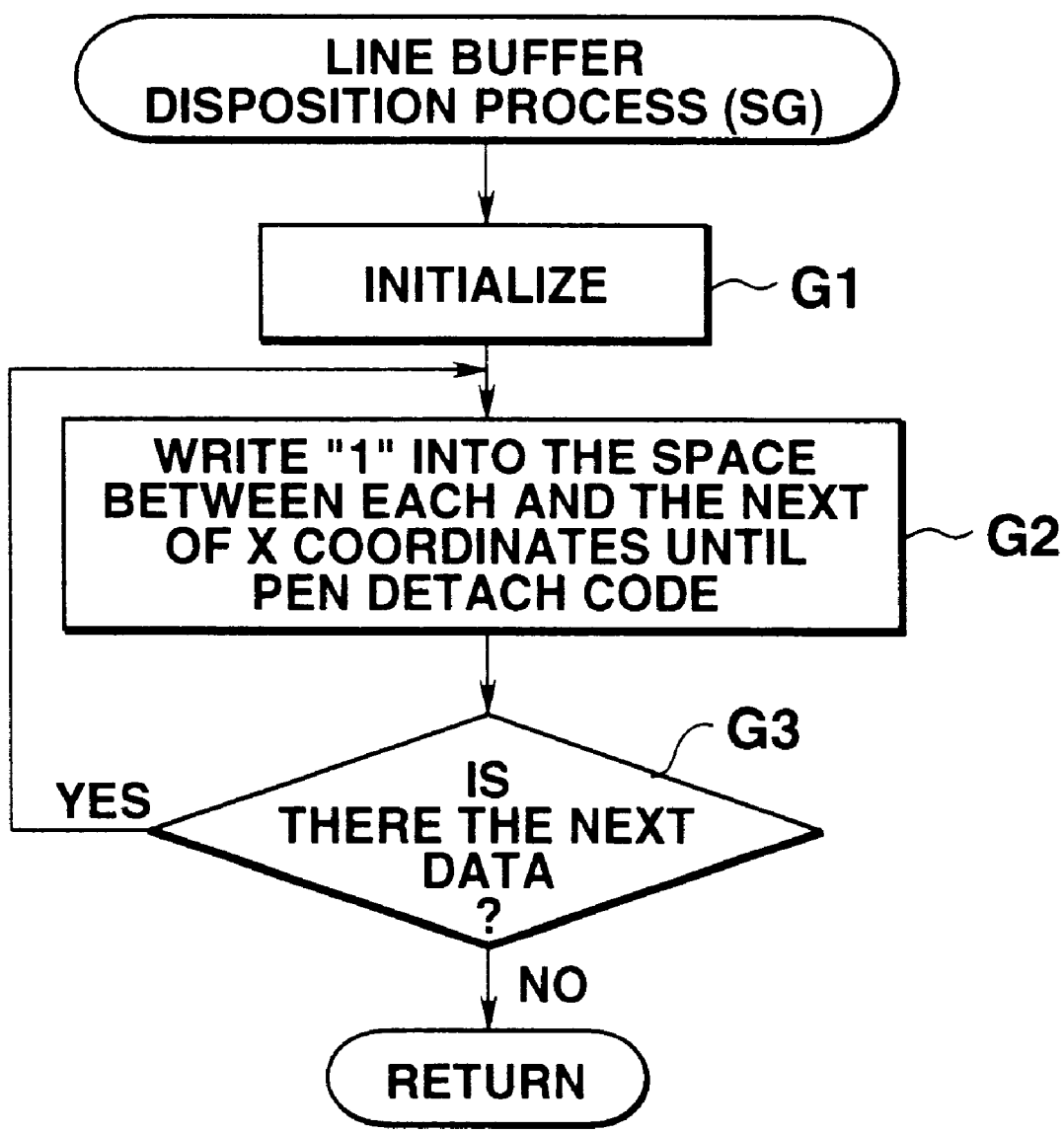
FIG. 17 is a flow chart indicative of a handwritten character disposition subprocess performed in the line buffer in the character string extraction process.

As described above, even when "ABC D ef" is displayed finally on the touch panel 14, coordinate stings of "AC", "D", "ef" and "B" are sequentially stored in this order in the handwriting buffer 160 of RAM 23. When a character string extraction process of FIG. 16 is started in this state, first, the control passes to a line buffer disposition process of FIG. 17 to dispose all the coordinate data stored in the handwriting buffer 160*a* in the one-dot line buffer 160*b* of RAM 23 (step SG).

In this line buffer disposition process, first, the one-dot line buffer 160*b* of RAM 23 is cleared and the address pointer of the handwriting buffer 160*a* is reset or initialized at "0" (step G1).

In response, only the x coordinates $x_1, x_2, \ldots$ of the coordinate data $(x_1, y_1), (x_2, y_2), \ldots (x_n, y_n)$ stored in the handwriting buffer 160*a* (FIG. 15) and corresponding to the head x coordinate to the subsequent closest pen detach code are read out sequentially and dot data "1" is written into the one-dot line buffer 160*b* in correspondence to the space between each x coordinate and the next (step G2).

As for the handwritten data "A" illustrated in FIG. 14, "1" is written into the space between $x_1$ and $x_2$, the space between $x_2$ and $x_3$ and the space between $x_4$ and $x_5$ with there being no connection at a pen detach position.

In this way, when dot data "1" is written sequentially into the position between each and the next of the sampled x-coordinates of coordinates of each stored handwritten character marked off by a pen detach code, a locus corresponding to the x direction components of the character string data is obtained in the one-dot line buffer 160*b*, as shown in FIG. 13 (steps G2, G3).

Figure 18:
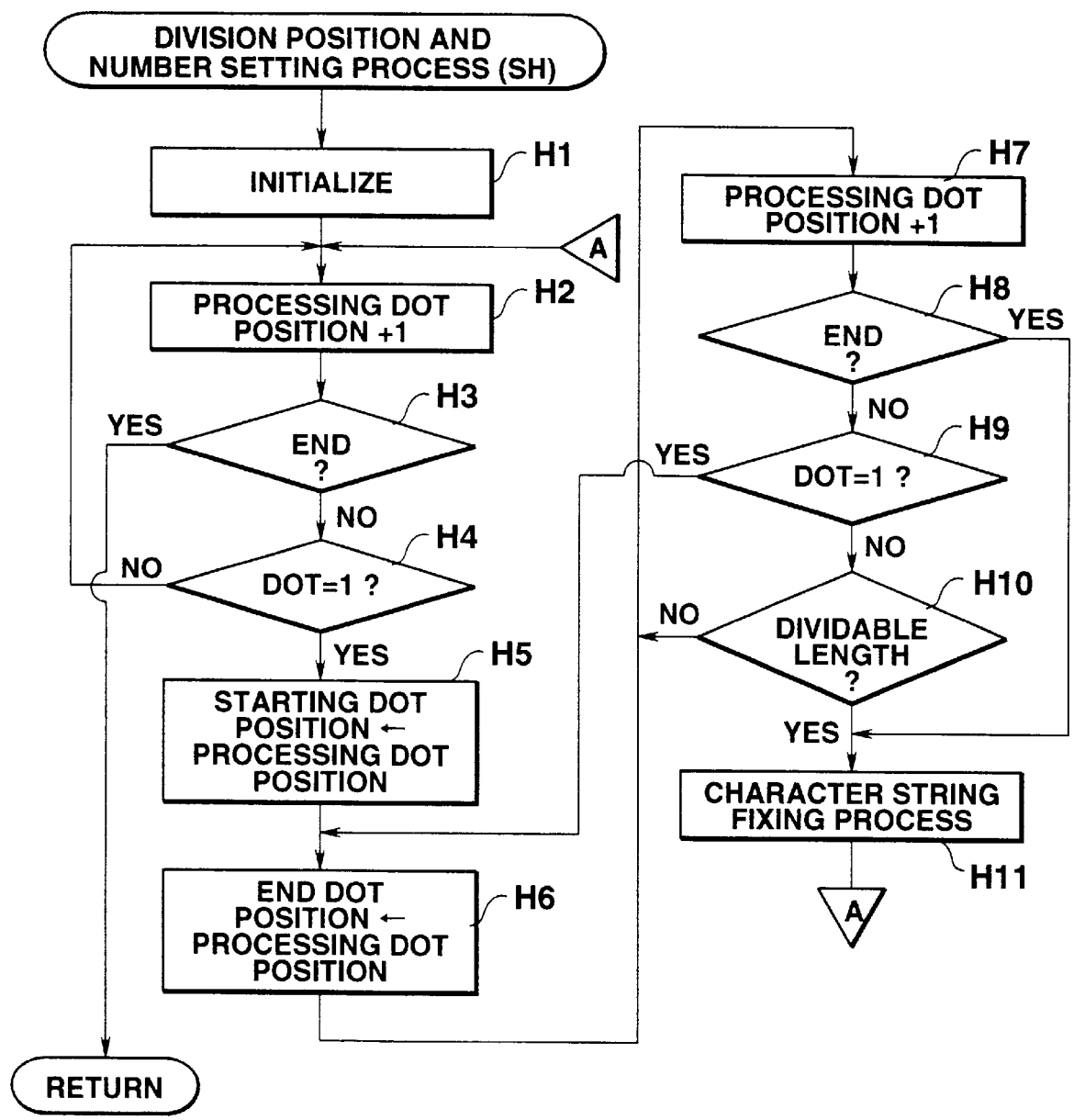
FIG. 18 is a flow chart indicative of a division position/number setting subprocess of the character string extraction process.

In this way, when locus data which corresponds to only the x direction components of the character string data is written into the one-dot line buffer 160*b* of RAM 23, the control then passes to a division position and number setting process of FIG. 18 to obtain the division position and division count of the character string data (step SH).

In this division position and number setting process, first, the processing dot position register 160*c*, the starting dot position register 160*d*, the end dot position register 160*e*, and the division position memory 160*f* of RAM 160 are all cleared and initialized (step H1).

In response, the processing dot position stored in the processing dot position register 160*c* is sequentially incremented by one and it is then determined whether dot data "1" exists at each of the dot locations in the one-dot line buffer 160*b* indicative of the processing dot positions, starting with its head dot (step H2, H3→H4).

When the processing dot position stored in the processing dot position register 160*c* reaches the end dot in the one-dot line buffer 160*b*, the division position and number setting process ends (step H3→RETURN).

When the processing dot position in the one-line dot buffer 160*b* reaches the first dot-present position "a" for the character data "A" (FIG. 13), the processing dot position "a" at that time is written into the starting dot position register 160*d* and also into the end dot position register 160*e* (step H4→H5, H6).

In addition, the processing dot position is sequentially incremented by one. It is then determined whether successive dot data "1's" exist at the respective dot positions of the one-dot line buffer 160*b* indicative of the processing dot positions (steps H7, H8→H9). In a state where it is determined that there are successive processing dots after the existing position "a" of the initial dot corresponding to the character "A" has been reached at step H4, only the end dot position stored in the end dot position register 160*e* is updated repeatedly in correspondence to the processing dot position updated sequentially at step H7 (step H6→H9).

When the processing dot position for the one-dot line buffer 160*b* reaches the end dot-present position "b" for the character data "A", the processing dot position "b" data is written into the end dot position register 160*e* at step H6. The processing dot position is further incremented by one at step H7. When it is then determined at step H9 that a dot "1" corresponding to the character data "A" has become absent, the control passes to step H10, where an empty interval between the processing dot position and the end dot position is calculated and it is then determined whether the magnitude of the empty interval has reached a dividable length corresponding to a preset predetermined number of dots. At the beginning, the magnitude of the empty interval is "0", so that the control returns to step H7, where the processing dot position is updated while it is determined whether the magnitude of the empty interval has reached the dividable length (steps H7–H10).

Assume now that the predetermined number of dots is "10", that the space between the positions "b" and "c" corresponds to 5 dots, that the space between the positions "d" and "e" corresponds to 4 dots, and that the space between the positions "f" and "g" corresponds to 20 dots. In this case, the processing dot positions at steps H7–H10 are updated, and the processing dot position reaches the initial dot-present position "c" for the next character data "B" before the empty interval between the processing dot position and the end dot position reaches a dividable length of 10 dots. Thus, the end dot position b stored in the end dot position register 160e is updated to the current processing dot position "c" (step H9→H6).

Thereafter, similarly, the processing (H6→H9) in which the successiveness of dots data "1's" in the one-dot line buffer 160b is determined and the processing in which it is determined whether the empty interval subsequent to the dot data "1" has reached a dividable length (steps H7–H10) are repeated, and the end dot position "b" stored in the end dot position register 16e is sequentially updated in order of c→d→e→f. When it is then determined that the processing dot position is sequentially updated beyond the position where the dot data "1" for the character data "C" is present, and that the empty interval (between the processing dot position and the end dot position) has reached a dividable length (10 dots) corresponding to the preset predetermined number of dots, the control passes from H10 to H11. At step H11, data on the starting dot position "a" stored already in the starting dot position register 160d at step H5 and data on the end dot position "f" stored in the end dot position register 160e at step H6 are written as the division starting and end coordinates ($x_{S1}$, $X_{E1}$), respectively, of the first character string into the division position memory 160f because the character data "ABC" is dealt with as one character string, and the character string count of the character string count register 160g is updated to "1".

Thereafter, similarly, the processing at steps H2–H11 is iterated and data on the respective dot coordinates $x_{S2}$-$x_{E2}$ in the one-dot line buffer 160b for the character data "D" is written as the division starting-end coordinates of a second character string into the division position memory 160f, and data on the dot coordinates $x_{S3}$-$X_{E3}$ in the one-dot line buffer 160b for the character data "cf" is written as the division starting-end coordinates of a third character string into the division position memory 160f, and the character string count of the character string count register 160g is updated to "3".

Figure 19:
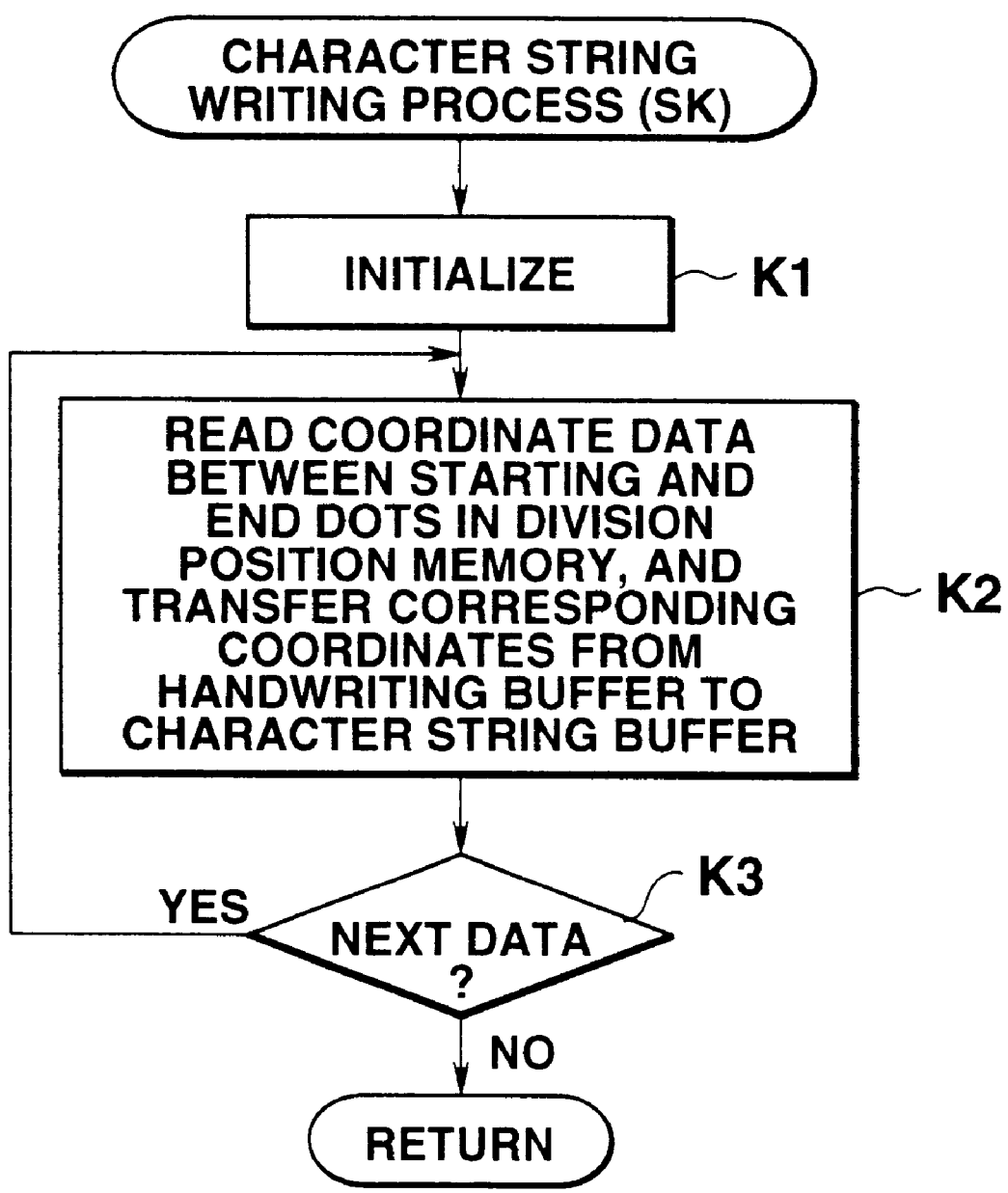
FIG. 19 is a flow chart indicative of a character string writing subprocess of the character string extraction process.

Thereafter, the processing dot position stored in the processing dot position register 160c is repeatedly updated in the processing at steps H2-H4. When it is then determined that the end dot position of the one-dot line buffer 160b has been reached before it is determined whether dot data "1" exists, the division position and number setting process ends. The control then passes to a character string writing process of FIG. 19 (step H3→SK).

In this character string writing process, first, the character string buffer 160h of RAM 23 is cleared and initialized (step K1). In response, data on the division starting-end coordinates $x_{S1}$ -$_{xE1}$ of the first character string stored in the division position memory 160f is read out, and as a result, data on x coordinates contained in the division starting-end coordinates $x_{S1}$-$x_{E1}$ is transferred from the handwritten data buffer 160a (FIG. 15) to the character string buffer 160h. In this case, the coordinate strings "A", "C" and "B" are selectively read out and written as one-unit coordinate string data corresponding to the input range of character data into the character string buffer 160h, as shown in FIG. 20A (step K2).

When it is then determined that there is data on a division position subsequent to the division starting-end coordinates $x_{S1}$-$x_{E1}$ of the first character string in the division position memory 160f, data on the division starting-end coordinates $x_{S2}$-$X_{E2}$ of the second character string and data on the division starting-end coordinates $x_{S3}$-$X_{E3}$ of the third character string are sequentially read out. Data on x coordinates for the respective character strings contained in the spacings between the division starting and end coordinates $x_{S2}$-$x_{E2}$ and between the division starting and end coordinates $x_{S3}$-$x_{E3}$ are sequentially and selectively read out as coordinate strings "D" and "ef" from the handwriting data buffer 160a (FIG. 15), and written as one-unit coordinate string data corresponding to the input range of character data into the character string buffer 160h, as shown FIGS. 20B and C, respectively, (steps K3→K2).

Thus, even when the order in which the respective characters are written into the touch panel 14 is reversed, the coordinate string data which constitutes each character string can be stored and managed as one-unit data corresponding to the positions where the character string is input.

Thus, when, for example, "D" and "ef" have been underlined, the "D ef" and its underline can be dealt with as a single item of data because the starting-end coordinates of the second character string are "g" and "j", respectively.

What is claimed is:
1. A data input device for displaying on a display screen input handwritten data which is inputted by a user with a pen on the display screen, comprising:
   a tablet-type data generator device provided on said display screen for generating coordinate data in accordance with a locus of input handwritten data;
   an input image display device for displaying a locus of an image representing the handwritten data on said display screen on the basis of the coordinate data output from said coordinate data generator device;
   a detecting device for detecting whether coordinate data contained in a predetermined area provided at a right hand end position of the display screen is obtained while the handwritten data is being input;
   a determining device for determining when the pen is detached from said display screen and hence when input of the handwritten data is interrupted; and
   a scrolling device, responsive to said determining device determining that the pen is detached from said display screen, for scrolling leftward the display screen on which the displayed locus of the handwritten data is displayed so that a next handwritten data may be input, on the condition that said detecting device has detected that coordinate data contained in a predetermined area provided at a right-hand end position of the display screen is obtained.

2. The data input device according to claim 1, further comprising:
   a memory device for storing as locus data, the coordinate data generated by said tablet-type data generator device;
   a correcting device for correcting the coordinate data output by said tablet-type data generator device after said scrolling device has scrolled the display screen, depending on a quantity of scrolling of the display screen; and
   a storage device for storing in said memory device the coordinate data corrected by said correcting device.

3. The data input device according to claim 2, further comprising:
   a counting device for counting the number of times scrolling occurs on the display screen; and
   wherein said correcting device determines a quantity of corrections made to the coordinate data on the basis of the number counted by said counting device.

4. The data input device according to claim 1, wherein said display screen is scrolled such that a part of a right-hand end portion of a locus of an image represented by the input handwritten data is displayed.

5. A data input device according to claim 1, further comprising:
- a second display screen provided beside said coordinate data generator device;
- a fixing device for fixing the handwritten image displayed by said input image display device; and
- a control device, responsive to said fixing device fixing the handwritten image, for clearing the handwritten image and for causing said second display screen to display the handwritten data fixed by said fixing device.

6. A data input device according to claim 5, wherein said display control device includes a size adjusting device for adjusting a size of the handwritten image displayed by said input image display device to a size of said second display screen.

7. A data input device according to claim 5, further comprising:
- a text data input device; and
- a display control device for displaying the text data inputted by said text input device and the handwritten image data fixed by said fixing device in a mixed manner on said second display screen.

* * * * *